US010395784B2

(12) United States Patent
Ginsberg et al.

(10) Patent No.: US 10,395,784 B2
(45) Date of Patent: Aug. 27, 2019

(54) METHOD AND SYSTEM FOR EXTERNAL ALTERNATE SUPPRESSION POOL COOLING FOR A BWR

(75) Inventors: Robert J. Ginsberg, Wilmington, NC (US); Edward C. Andersen, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 705 days.

(21) Appl. No.: 13/609,926

(22) Filed: Sep. 11, 2012

(65) Prior Publication Data

US 2014/0072088 A1 Mar. 13, 2014

(51) Int. Cl.
*G21C 15/18* (2006.01)
*G21D 1/02* (2006.01)

(52) U.S. Cl.
CPC ............ *G21C 15/182* (2013.01); *G21D 1/02* (2013.01); *Y02E 30/31* (2013.01)

(58) Field of Classification Search
CPC ............................ F28D 1/06; B01J 2219/0009
See application file for complete search history.

(56) References Cited

U.S. PATENT DOCUMENTS 3,859,166 A * 1/1975 Flynn .................... G21C 15/18 376/282
4,877,574 A * 10/1989 Suzuki et al. ................ 376/216
5,082,619 A 1/1992 Sawyer
5,087,408 A 2/1992 Tominaga et al.
5,169,595 A * 12/1992 Cooke .................... G21C 15/18 376/282
5,303,274 A 4/1994 Sawyer
5,349,616 A * 9/1994 Nakayama et al. .......... 376/282
5,377,243 A 12/1994 Hill
8,721,982 B2 * 5/2014 Yamazumi ............... B01J 19/18 165/168
8,971,477 B2 * 3/2015 Thome .................... F22B 1/023 376/458

(Continued)

FOREIGN PATENT DOCUMENTS

CN 201681637 U * 12/2010 ............. G21C 15/18
JP 5248798 A 4/1977

(Continued)

OTHER PUBLICATIONS

Cleveland, J., et al. "Natural circulation in water cooled nuclear power plants," pp. 20-23, published 2005.*

(Continued)

*Primary Examiner* — Lily C Garner
(74) *Attorney, Agent, or Firm* — Harness, Dickey & Pierce, P.L.C.

(57) ABSTRACT

A method and system for external alternate suppression pool cooling for a Boiling Water Nuclear Reactor (BWR) that does not breach the Mark I primary containment. The external cooling system may include a heat sink fluidly coupled to cooling coils surrounding the suppression pool. Cool water may be pumped through the cooling coils without the need for normal plant electrical power, which is ideal during a plant emergency. The cooling system may also be operated and controlled from a remote location to protect the safety of plant personnel.

14 Claims, 4 Drawing Sheets

(56) References Cited

U.S. PATENT DOCUMENTS

| | | | | |
|---|---|---|---|---|
| 2012/0250813 A1* | 10/2012 | Lloyd | G21C 19/07 376/298 |
| 2013/0156145 A1 | 6/2013 | Ginsberg et al. | |

FOREIGN PATENT DOCUMENTS

| | | | | | |
|---|---|---|---|---|---|
| JP | 5465296 A | | 5/1979 | |
| JP | 55-138737 | * | 10/1980 | |
| JP | 5763298 U | | 4/1982 | |
| JP | 1986-122600 | * | 8/1986 | G21C 19/06 |
| JP | 61122600 U | | 8/1986 | |
| JP | 1987-238494 | * | 10/1987 | G21C 19/08 |
| JP | 62238494 A | | 10/1987 | |
| JP | 0247586 A | | 2/1990 | |
| JP | H02-251795 A | | 10/1990 | |
| JP | 06230177 A | | 8/1994 | |
| JP | 06-317690 | * | 11/1994 | G21C 9/00 |
| JP | 06317690 A | * | 11/1994 | |
| JP | 2004061192 A | | 2/2004 | |
| TW | 131090 B | | 3/1990 | |
| TW | I366198 B | | 6/2012 | |

OTHER PUBLICATIONS

Hannahan, Bill. Mar. 29, 2011. Comment made on "Fukushima Open Thread—Tue 3/29". Permalink: www.theoildrum.com/node/7731#comment-784825.*

Human translation attached for Murase (JP06-317690 A) reference.*

"Low Pressure Emergency Core Cooling Systems," *Nuclear Power Plants*, Nuclear Power Plant Information, http://nuclearstreet.com/nuclear-power-plants/w/nuclear_power_plants/low-pressure-emergency-core-cooling-systems.aspx.

Aug. 8, 2014 U.S. Office Action issued in corresponding U.S. Appl. No. 13/611,384.

Unofficial English translation of Japanese Office Action issued in connection with corresponding JP Application No. 2013-185810 dated Jul. 21, 2015.

Extended European Search Report and Opinion issued in connection with corresponding EP Application No. 13183582.9 dated Mar. 20, 2017.

Office and Search Action issued in connection with corresponding TW Application No. 102132491 dated Jun. 2, 2017.

* cited by examiner

METHOD AND SYSTEM FOR EXTERNAL ALTERNATE SUPPRESSION POOL COOLING FOR A BWR

BACKGROUND OF THE INVENTION

Field of the Invention

Example embodiments relate generally to nuclear reactors, and more particularly to an external alternate cooling system of the suppression pool for a Boiling Water Nuclear Reactor (BWR). The cooling system may provide emergency cooling of the suppression pool without breaching any primary containment boundaries.

Related Art

FIG. 1 is a cut-away view of a conventional boiling water nuclear reactor (BWR) reactor building 5. The suppression pool 2 is a torus shaped pool that is part of the reactor building primary containment. Specifically, the suppression pool 2 is an extension of the steel primary containment vessel 3, which is located within the shell 4 of the reactor building 5. The suppression pool 2 is positioned below the reactor 1 and spent fuel pool 10, and is used to limit containment pressure increases during certain accidents. In particular, the suppression pool 2 is used to cool and condense steam released during plant accidents. For instance, many plant safety/relief valves are designed to discharge steam into the suppression pool 2, to condense the steam and mitigate undesired pressure increases. Conventionally, a BWR suppression pool 2 is approximately 140 feet in total diameter (i.e., plot plan diameter), with a 30 foot diameter torus shaped shell. During normal operation, the suppression pool 2 usually has suppression pool water in the pool at a depth of about 15 feet (with approximately 1,000,000 gallons of suppression pool water in the suppression pool 2, during normal operation).

The pool 2 is conventionally cleaned and cooled by the residual heat removal (RHR) system of the BWR plant. During normal (non-accident) plant conditions, the RHR system can remove water from the suppression pool 2 (using conventional RHR pumps) and send the water through a demineralizer (not shown) to remove impurities and some radioactive isotopes that may be contained in the water. During a plant accident, the RHR system is also designed to remove some of the suppression pool water from the suppression pool 2 and send the water to a heat exchanger (within the RHR system) for cooling.

During a serious plant accident, not anal plant electrical power may be disrupted. In particular, the plant may be without normal electrical power to run the conventional RHR system and pumps. If electrical power is disrupted for a lengthy period of time, water in the suppression pool may eventually boil and impair the ability of the suppression pool to condense plant steam and reduce containment pressure.

In a plant emergency, use of the RHR system may cause highly radioactive water (above acceptable design limits) to be transferred between the suppression pool and RHR systems (located outside of primary containment). The transfer of the highly radioactive water between the suppression pool and RHR system may, in and of itself, cause a potential escalation in leakage of harmful radioactive isotopes that may escape the suppression pool. Additionally, radiation dosage rates in areas of the RHR system could be excessively high during an accident, making it difficult for plant personnel to access and control the system.

SUMMARY OF INVENTION

Example embodiments provide a system for externally cooling the suppression pool for a Boiling Water Nuclear Reactor (BWR). The system may provide external cooling for the suppression pool, without breaching primary containment and without the need for normal plant electrical power. The cooling system may be operated and controlled from a remote location to protect the safety of plant personnel during a plant emergency. Example embodiments also include a method of making the system.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
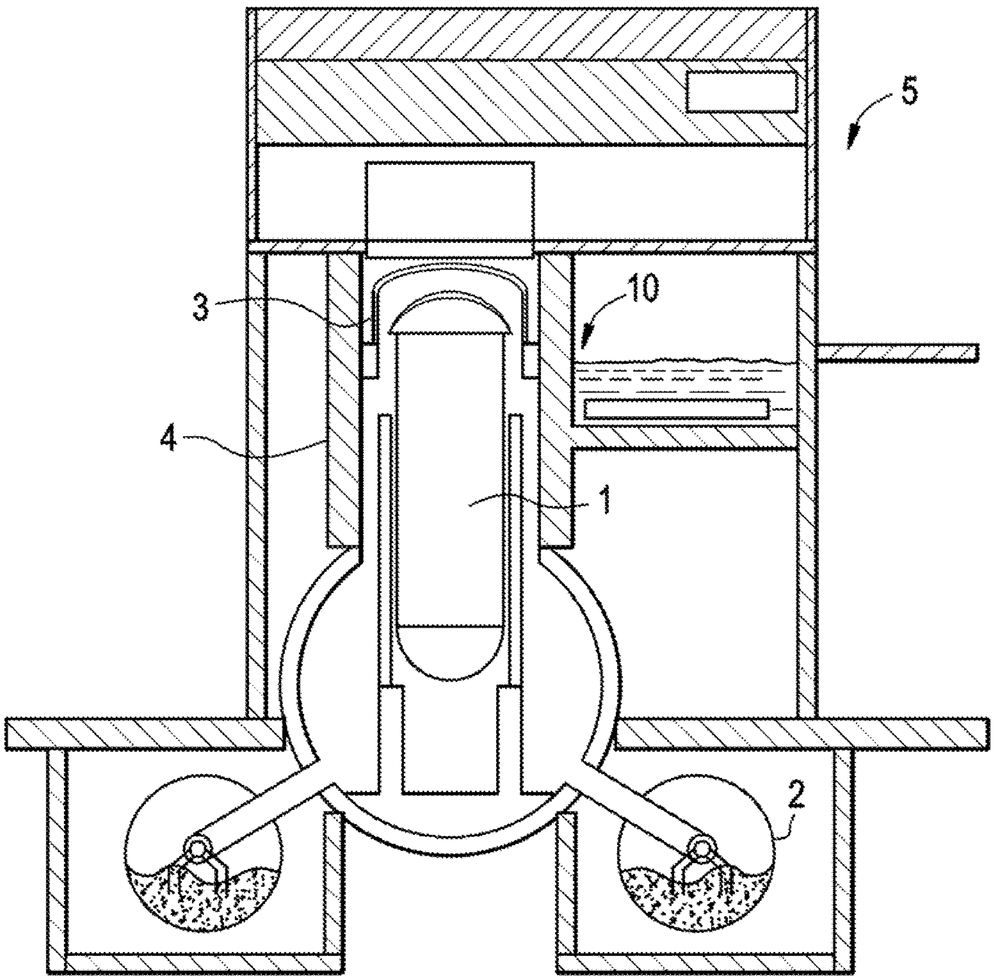
FIG. 1 is a cut-away view of a conventional boiling water nuclear reactor (BWR) reactor building.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
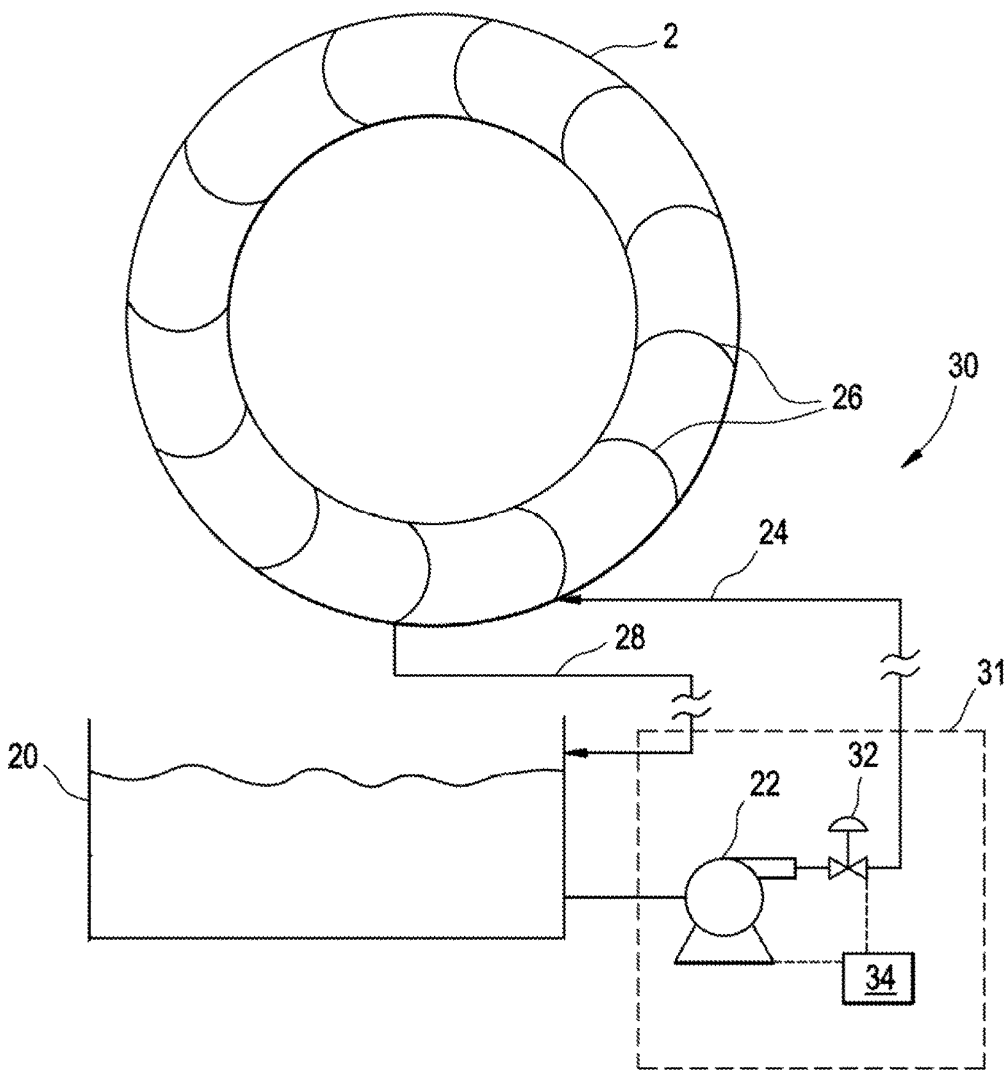
FIG. 2 is an overhead view of an external cooling system, in accordance with an example embodiment.

FIG. 2 is an overhead view of an external cooling system 30, in accordance with an example embodiment. The external cooling system 30 may include cooling coils 26 wrapped around the suppression pool 2 and fluidly coupled to a heat sink 20 that provides external cooling for the suppression pool 2. The cooling coils 26 may be a flexible coil, branched tubing, a blanket, or any other apparatus that increases a surface area (for maximum heat transfer) between the outer shell of the suppression pool 2 and the coil 26. The cooling coils 26 may be flexible to allow the coil 26 to form around the shape of the suppression pool 2 to maximize the direct exposure between the coils 26 and the suppression pool 2 outer surface.

The heat sink 20 may be a large, man-made or natural body of water. Liquid in the heat sink 20 may be water, or any other liquid fluid with a high heat capacity capable of optimizing heat exchange with the suppression pool 2. The cooler the liquid is in the heat sink 20, the more efficient the external cooling system 30 will be in cooling the suppression pool 2. The heat sink 20 may be fluidly coupled to the cooling coils 26 via pipes or tubing 24/28. Specifically, a pump 22 (connected to the heat sink 20) may discharge cool water from the heat sink 20 through a cool water inlet pipe 24 and into the cooling coils 26 wrapped around the suppression pool 2. A warm water outlet pipe 28 may discharge warm water from the cooling coils 26 back to the heat sink 20 (or, the water may alternatively be discharged to another location other than the heat sink 20).

Operation and controls of the external cooling system 30 may be positioned in a remote location 31 (relative to the suppression pool 2), to protect plant personnel from exposure to primary containment during a plant accident. Specifically, the pump 22 (and/or a controller 34 used to operate the pump 22) may be located in the remote location. Likewise, a control valve 32 (and/or a controller 34 used to operate the valve 32) for controlling a flow of water through the cooling coils 26 (and opening and closing the inlet pipe 24) may also be located in the remote location 31.

Figure 4:
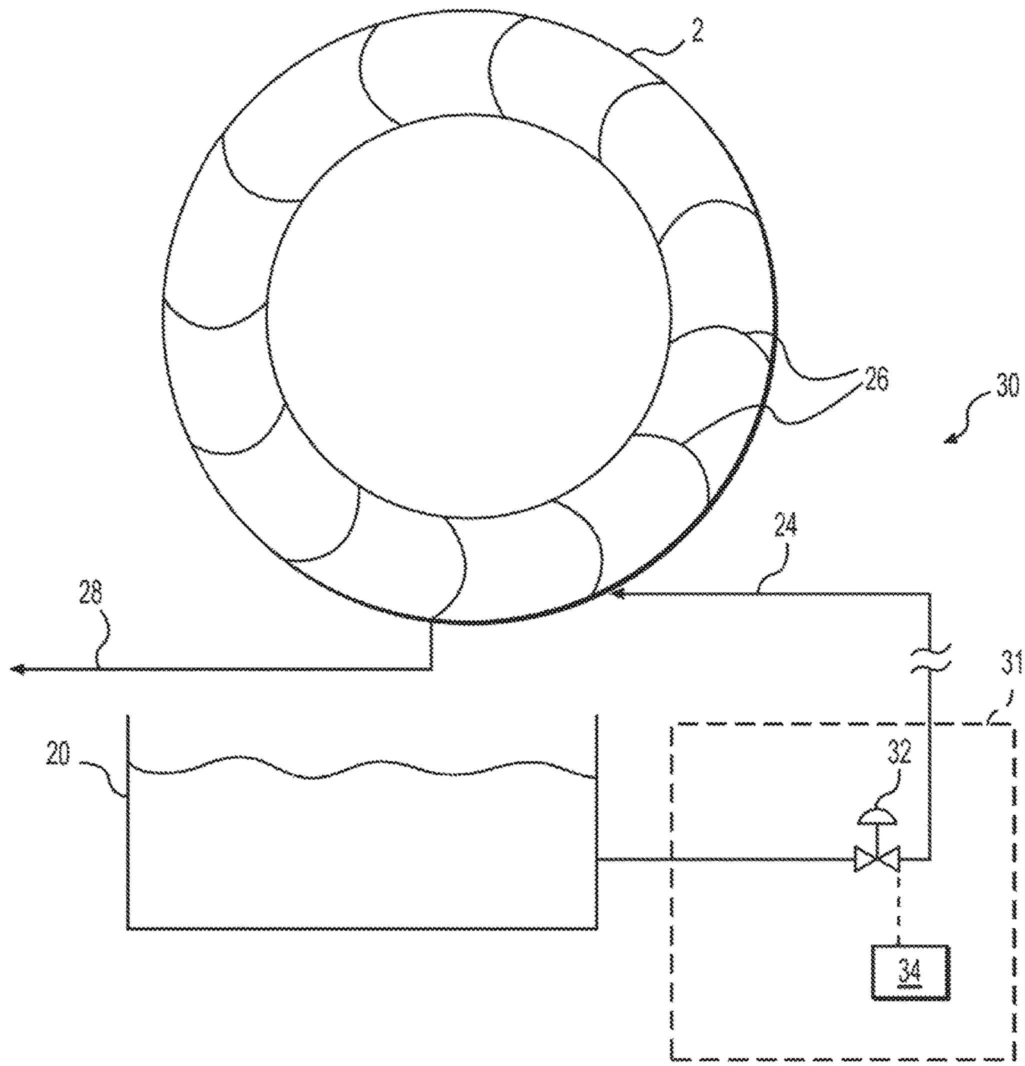
FIG. 4 is an overhead view of an external cooling system relying on gravity draining, in accordance with an example embodiment.

The pump 22 may be operated by a diesel generator, or directly by a mechanical engine, such that the operation of the pump need not rely on not anal plant electrical power (which is ideal, during a plant emergency). Alternative to the pump 22, the heat sink 20 may be located at an elevation that is above the suppression pool 2, allowing cool water from the heat sink 20 to gravity drain through the cooling coils 26 without the need for any electrical power (although this configuration, shown in FIG. 4, has the drawback of not being able to drain the water from outlet pipe 28 back into the heat sink 20).

The system 30 may operate to cool the suppression pool without the need for breaching (i.e., penetrating) the integrity of the suppression pool 2 and/or any primary containment structure. The system 30 also operates without displacing water from the suppression pool 2 or otherwise removing potentially contaminated water from containment.

Figure 3:
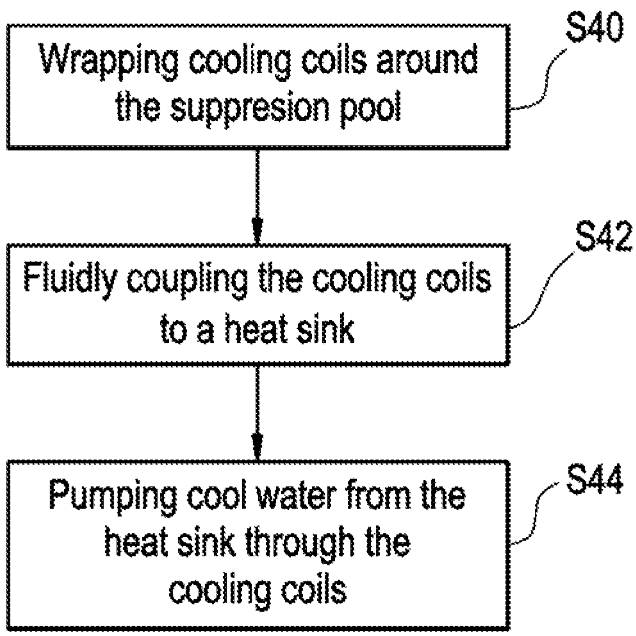
FIG. 3 is a flowchart of a method of making an external cooling system, in accordance with an example embodiment.

FIG. 3 is a flowchart of a method of making an external cooling system 30, in accordance with an example embodiment. Specifically, step S40 may include wrapping a cooling coil or coils 26 around an outer surface of the suppression pool 2 (see FIG. 2). Step S42 may include fluidly coupling the cooling coils 26 to a heat sink 20. This may be accomplished by connecting inlet and outlet pipes 24/28 to the cooling coils 26 surrounding the suppression pool 2. Step S44 may include pumping cooling water from the heat sink through the cooling coils 26, via the use of a pump 22 (or, alternatively, via gravity draining).

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A Boiling Water Reactor (BWR) external cooling system, comprising:

a suppression pool configured to provide cooling for the BWR;

closed cooling coils contacting and coiled around a cross-sectional outer periphery of the suppression pool; and a heat sink fluidly coupled to the cooling coils to provide a flow of cooling fluid through the cooling coils, wherein the system does not breach the suppression pool or any other primary containment structure, and the suppression pool is a torus shape with the cross-sectional outer periphery being circular, the cooling coils encircling the circular cross-sectional outer periphery of the suppression pool.

2. The BWR external cooling system of claim 1, further comprising:

a pump, fluidly coupled to the heat sink; and an inlet pipe connecting the pump to the cooling coils to provide the flow of cooling fluid through the cooling coils.

3. The BWR external cooling system of claim 2, further comprising:

an outlet pipe connected to the cooling coils to discharge warm water from the cooling coils back to the heat sink.

4. The BWR external cooling system of claim 2, wherein the pump is driven by a diesel generator.

5. The BWR external cooling system of claim 2, further comprising:

a control valve in the inlet pipe.

6. The BWR external cooling system of claim 5, further comprising a controller for controlling at least one of the pump and the control valve, the controller being positioned in a remote location relative to the suppression pool.

7. The BWR external cooling system of claim 1, wherein the heat sink is one of a man-made or natural body of water.

8. The BWR external cooling system of claim 3, wherein the inlet pipe and the outlet pipe form a closed system with the cooling coils such that the inlet pipe provides the flow of cooling fluid to the cooling coils and the outlet pipe returns all of the cooling fluid to the heat sink.

9. The BWR external cooling system of claim 8, wherein the cooling fluid is a liquid.

10. The BWR external cooling system of claim 1, wherein the flow of cooling fluid through the cooling coils occurs without the need for electrical power to be provided to the external cooling system.

11. The BWR external cooling system of claim 10, wherein the flow of cooling fluid through the cooling coils occurs via a gravity draining of the cooling fluid from the heat sink through the cooling coils.

12. The BWR external cooling system of claim 11, wherein an elevation of the heat sink is above an elevation of the suppression pool.

13. The BWR external cooling system of claim 10, wherein the flow of cooling fluid through the cooling coils is not drained back into the heat sink.

14. The BWR external cooling system of claim 10, wherein the flow of cooling fluid through the cooling coils is not returned to the heat sink.

* * * * *